United States Patent [19]

Baker et al.

[11] Patent Number: 4,588,604

[45] Date of Patent: May 13, 1986

[54] SOLVENT FRACTIONATION PROCESS FOR OBTAINING TEMPERABLE CONFECTIONERY FAT FROM PALM OIL

[75] Inventors: Joseph S. Baker; Rose M. Weitzel, both of Cincinnati, Ohio

[73] Assignee: The Procter & Gamble Company, Cincinnati, Ohio

[21] Appl. No.: 684,514

[22] Filed: Dec. 21, 1984

[51] Int. Cl.$^4$ ............................................. A23D 5/02
[52] U.S. Cl. ................................... 426/601; 426/607; 260/428.5
[58] Field of Search ............................ 426/607, 601; 260/428.5

[56] References Cited

U.S. PATENT DOCUMENTS

| | | |
|---|---|---|
| 2,903,363 | 9/1959 | Farr . |
| 3,012,891 | 12/1961 | Best et al. . |
| 3,084,049 | 4/1963 | Sinnema . |
| 3,093,480 | 6/1963 | Arnold . |
| 3,686,240 | 8/1972 | Kawada et al. . |
| 4,205,095 | 5/1980 | Pike et al. . |
| 4,465,703 | 8/1984 | Jasko et al. . |

FOREIGN PATENT DOCUMENTS

| | | |
|---|---|---|
| 81881 | 6/1983 | European Pat. Off. . |
| WO83/00418 | 2/1983 | PCT Int'l Appl. . |
| 827172 | 2/1960 | United Kingdom . |
| 893337 | 4/1962 | United Kingdom . |

OTHER PUBLICATIONS

Feuge et al, "Cocoa Butter-Like Fats from Domestic Oils," *J. Am. Oil Chem. Soc.*; vol. 35, (1958) pp. 194–199.
Hilditch et al, "The Composition of Commercial Palm Oils: Partial Separation of Palm Oils by Crystallization as an Aid to the Determination of the Component Glycerides," *J. Soc. Chem. Indus.*, (1940), pp. 67–71.

*Primary Examiner*—Robert Yoncoskie
*Attorney, Agent, or Firm*—Eric W. Guttag; Steven J. Goldstein; Richard C. Witte

[57] ABSTRACT

A process for obtaining a temperable confectionery fat from palm oil is disclosed herein. This process comprises the steps of:

(1) removing from palm oil by solvent fractionation one or more olein fractions to provide a first stearine fraction having less than about 10% combined SUU/UUU/SLS triglycerides by weight of the first stearine fraction;

(2) removing from the first stearine fraction by solvent fractionation one or more olein fractions to provide a second stearine fraction having less than about 8% SSO triglycerides by weight of the second stearine fraction; and (3) removing from the second stearine fraction by solvent fractionation a third stearine fraction to provide a confectionery fat having less than about 2.5% SSS triglycerides by weight of the confectionery fat; wherein S is palmitic (P) or stearic (St); and U is oleic (O) or linoleic (L).

The temperable confectionery fat obtained is particularly suitable for making chocolate having improved mouthmelt properties.

9 Claims, No Drawings

SOLVENT FRACTIONATION PROCESS FOR OBTAINING TEMPERABLE CONFECTIONERY FAT FROM PALM OIL

TECHNICAL FIELD

The present application relates to a process for obtaining a temperable confectionery fat from palm oil. This fat is useful in making chocolate.

Chocolate derives its desirable eating qualities largely from the melting properties of cocoa butter which is typically present at about 32% by weight. At room temperature (70°–75° F.), cocoa butter is a solid. As a result, chocolate is also firm and solid. Firmness is desirable not only to provide "snap" at initial bite, but also to resist deformation and surface marking of the chocolate from time of manufacture to time of consumption.

Above room temperature, cocoa butter melts progressively until it is fully melted near 93°–94° F. As such, cocoa butter is entirely liquid below body temperature (98.6° F.). This rapid melting at mouth temperature ("mouth melt") provides a smooth, creamy consistency during eating and insures rapid release of chocolate flavors to the mouth. The relatively sharp melting behavior just a few degrees below body temperature is unique to cocoa butter among all known natural fats. Other natural fats melt at either higher or lower temperatures, with less sharpness in melting. Higher melting fats provide an undesirable "waxy" eating texture in the chocolate and a "waxy after-feel" in the mouth. Lower melting fats provide a softer chocolate with less "snap" upon biting and greater susceptibility towards deformation and surface blemish.

The melting behavior of cocoa butter is the result of its unique triglyceride composition. Cocoa butter consists primarily (about 80% by weight) of saturated-oleic-saturated (SOS) triglycerides which melt near body temperature. These SOS triglycerides include the stearic-oleic-stearic (StOSt), palmitic-oleic-stearic (POSt) and palmitic-oleic-palmitic (POP) triglycerides. The remaining triglycerides are mostly the more unsaturated, lower-melting species such as StOO and POO triglycerides which constitute the liquid portion of cocoa butter at room temperature. Moreover, the higher-melting stearic triglycerides and the lower-melting palmitic triglycerides are present in a specific St:P weight ratio of 1.3±0.1, which has been deemed central to the unique melting properties of cocoa butter. For the important SOS triglycerides, this St:P ratio typically converts to about 48% POSt, about 35% StOSt, and about 17% POP triglycerides.

Cocoa butter has frequently been a scarce and therefore expensive fat. As a result, those in the chocolate industry have sought less expensive substitute fats. An important characteristic for such cocoa butter substitutes is tempering compatibility with cocoa butter. To provide the expected properties of mouth melt and firmness, the cocoa butter in chocolate must be properly tempered to form beta-3 seed crystals. These seed crystals serve as nucleation sites for rapidly converting the remainder of the cocoa butter fat to the solid beta-3 form during subsequent cooling of the molded or enrobed chocolate. Proper tempering is not straightforward because cocoa butter is polymorphic, i.e. can exist in several different crystaline forms other than beta-3. Cocoa butter can exist in the alpha form which changes at room temperature to the beta-prime form (melting point 80°–84° F.) which then changes more slowly to the stable beta-3 form (melting point of 93°–95° F.). A substitute which partially replaces cocoa butter in the chocolate or is blended with chocolate-liquor (which contains 50 to 58% cocoa butter) must have a triglyceride composition compatible with cocoa butter to form the necessary beta-3 seed crystals for subsequent rapid conversion to the solid beta-3 form. Otherwise, the chocolate formed during molding or enrobing will not have the proper firmness or mouth melt and will likely form bloom, i.e. an undesirable whitish or greyish formation visible on the surface of the chocolate but also present in the interior.

Cocoa butter substitutes are frequently derived from cheaper, naturally occurring fats such as Illipe butter (Borneo tallow), Shea butter, Mowrah fat, and especially palm oil. For example, British patent specification No. 827,176 to Best et al., published Feb. 3, 1960, discloses the preparation of cocoa butter substitutes by removing from palm oil at least 50% (preferably 60%) of a lower melting glyceride fraction, and by also preferably removing 5–15% of the highest melting glyceride fraction. See also Example 1 of U.S. Pat. No. 2,903,363 to Farr, issued Sept. 8, 1959, which discloses the double acetone fractionation of melted palm oil to obtain a fat suitable for chocolate coatings. Similarly, U.S. Pat. No. 3,093,480 to Arnold, issued June 11, 1963, discloses the preparation of cocoa butter substitutes by double acetone extraction of palm oil.

Obtaining a cocoa butter substitute from palm oil which is compatible with cocoa butter is not straightforward. Initial consideration must be given to maximizing the level of key SOS triglycerides. This is usually accomplished by removing the liquid triglycerides. See, for example, the Best al process. However, during the process of removing the liquid triglycerides, the level of other, undesirable triglycerides is also increased, in particular the SSO and SSS triglycerides. At higher levels, the SSO and SSS triglycerides have been found to cause the lack of compatibility of palm oil-based substitutes with cocoa butter. Accordingly, a process for obtaining a cocoa butter compatible substitute from palm oil needs to minimize the level of these undesired triglycerides, while at the same time maximizing the level of desired SOS triglycerides.

BACKGROUND ART

A. Solvent fractionation of palm oil to obtain fats useful as cocoa butter substitutes British patent specification No. 827,172 to Best et al., published Feb. 3, 1960, discloses a process for obtaining a palm mid-fraction by removing from palm oil at least 50% by weight of a low melting glyceride fraction, and preferably 5–15% by weight of the highest melting glyceride fraction. Examples 2 and 3 provide embodiments of this process where palm oil is solvent fractionated in acetone by removing an olein fraction in the first stage and then a stearine fraction in the second stage. Examples 4 and 5 disclose embodiments of this process where palm oil is fractionated in acetone by removing an olein fraction in the first stage, a stearine fraction in the second stage, and an olein fraction in the third stage. U.S. Pat. No. 3,012,891 to Best et al., issued Dec. 12, 1961, discloses a similar process for obtaining a palm mid-fraction useful in cocoa butter substitutes. See also Example III(b) of U.S. Pat. No. 3,084,049 to Sinnema, issued Apr. 2, 1963, which discloses acetone fractionation of palm oil to obtain a palm fraction suitable in cocoa butter substitutes by removing an olein fraction in the first stage, a stearine fraction in the second stage, and an olein fraction in the third stage.

U.S. Pat. No. 2,903,363 to Farr, issued Sept. 8, 1959, discloses acetone fractionation of melted palm oil to obtain a fat suitable for chocolate coatings. In this process, the mixture of palm oil and acetone is held at 60° F. to obtain a first set of crystals which are filtered off. The filtrate is then cooled to 30° F. to obtain a second crop of fat crystals used in the chocolate coating.

B. Solvent extraction of palm oil to obtain fats useful as cocoa butter substitutes Example III(a) of U.S. Pat. No. 3,084,049 to Sinnema, issued Apr. 2, 1963, discloses a two stage solvent extraction process for preparing a palm fat suitable in cocoa butter substitutes. In the first stage, flakes of palm oil are extracted with acetone at 2°, 5° and 7° C. In the second stage, these flakes from the first stage are extracted at 22°, 25°, 28° and 30° C. The extracts from the second stage are combined and the acetone evaporated to obtain the palm fat.

U.S. Pat. No. 3,093,480 to Arnold, issued June 11, 1963, discloses a two stage process for solvent extraction of palm oil to obtain a cocoa butter substitute fat. In the first stage, a fat or fat mixture such as palm oil in a solid or semi-solid state is extracted with acetone once or several times at the same or an increasing temperature between −5° and 10° C. In the second stage, the fat residue from the first stage is extracted once or several times with acetone at the same or an increasing temperature between 10° and 35° C. The fat obtained from these extracts in the second stage is used as the cocoa butter substitute.

DISCLOSURE OF THE INVENTION

The present invention relates to a process for obtaining a confectionery fat from palm oil. The fat obtained by this process is particularly useful in making chocolate having improved mouth melt properties. The fat obtained by this process is also compatible with cocoa butter, i.e. can be formulated with chocolate-liquor, to provide temperable chocolate compositions.

The process of the present invention comprises the steps of:

(1) removing from palm oil by solvent fractionation one or more olein fractions to provide a first stearine fraction having less than about 10% combined SUU/UUU/SLS triglycerides by weight of the first stearine fraction;

(2) removing from the first stearine fraction by solvent fractionation one or more olein fractions to provide a second stearine fraction having less than about 8% SSO triglycerides by weight of the second stearine fraction; and (3) removing from the second stearine fraction by solvent fractionation a third stearine fraction to provide a confectionery fat having less than about 2.5% SSS triglycerides by weight of the confectionery fat;

wherein S is palmitic (P) or stearic (St); and U is oleic (O) or linoleic (L).

This basically three-step process permits maximization of the desired SOS triglycerides in the confectionery fat obtained, while at the same time minimizing the level of undesired SSO and SSS triglycerides.

Process for Obtaining Confectionery Fat

A. Definition and Measurement of Key Triglycerides

In defining the process of the present invention, the key triglycerides are the saturated-oleic-saturated (SOS), saturated-unsaturated-unsaturated (SUU), unsaturated-unsaturated-unsaturated (UUU), saturated-linoleic-saturated (SLS), saturated-saturated-oleic (SSO), and saturated-saturated-saturated (SSS) triglycerides. As used herein, the term "combined SUU/UUU/SLS triglycerides" refers to the total percentage of SUU, UUU and SLS triglycerides in a fat. As used herein, S refers to the stearic (St) or palmitic (P) fatty acid residues of the glyceride molecule; U refers to the oleic (O) or linoleic (L) fatty acid residues of the glyceride molecule. The percentages of these triglycerides (by weight) in a fat can be determined by Argentation Thin Layer Chromatography (hereafter Argentation). Argentation uses silver nitrate as a complexing agent in chromatographic separation. The triglycerides separate according to the degree of unsaturation and the position of the fatty acid on the glyceride molecule. However, chain length of the saturated fatty acids cannot be determined by this method. For example, Argentation can be used to distinguish SOS, SSO and SOO triglycerides, but cannot be used to distinguish POP, POSt, and StOSt triglycerides. The specific Argentation method used to determine the triglyceride composition of fat fractions obtained by the process of the present invention is described hereafter under the Analytical Methods section of the present application.

B. Solvent Fractionation of Palm Oil

The present invention basically involves a triple stage solvent fractionation process. As used herein, the term "palm oil" refers to unfractionated whole palm oil or partially fractionated palm oil. As used herein, "solvent fractionation" refers to the steps of providing a fat dissolved or melted in a suitable solvent (hereafter defined), crystallizing out fat crystals from the solvent and then separating the fat crystals (stearine fraction) from the solvent phase which contains the olein (liquid) fraction. In the first stage of this process, most of the liquid SUU/UUU/SLS triglycerides are removed. Initially, palm oil is melted in a suitable solvent. One or more olein fractions are then removed from the melted palm oil by solvent fractionation to provide a stearine fraction. This stearine fraction contains less than about 10% (preferably less than about 5%) by weight SUU/UUU/SLS triglycerides. The olein fraction(s) obtained during this first stage contain predominantly the SUU/UUU/SLS (POO) triglycerides and are useful as hereafter described.

The second fractionation stage of this process primarily involves removal of the SSO triglycerides. The stearine fraction from the first stage is melted in a suitable solvent and then one or more olein fractions are removed by solvent fractionation to provide another stearine fraction. This stearine fraction from the second stage contains less than about 8% (preferably less than about 5%) by weight SSO triglycerides.

The third fractionation stage primarily involves removal of the SSS triglycerides. The stearine fraction from the second stage is melted in a suitable solvent and then a stearine fraction is removed therefrom. This stearine fraction from the third stage contains most of the SSS triglycerides originally present in the palm oil.

The olein fraction obtained in this third stage provides the desired confectionery fat which has less than about 2.5% by weight SSS triglycerides.

Suitable solvents for use in this triple stage fractionation process include hexane, hexane/$C_1$-$C_3$ alcohol mixtures (e.g. hexane/isopropyl alcohol), and especially acetone. The particular temperatures used for crystallization and separation of the stearine fractions from the olein fractions and the weight ratios of solvent to fat used for the solvent fractionations performed in the various stages of this process can vary, especially depending on the solvent used. Also, it is frequently desirable to perform several solvent fractionations in one or more of the three fractionation stages in order to effect better separation and removal of the SSU/UUU/SLS, SSO and SSS triglycerides, without significant loss of the key SOS triglycerides.

A preferred embodiment of this three stage fractionation process using acetone as the solvent is as follows: The first stage involves two solvent fractionations. In the first fractionation, refined, bleached, deodorized (RBD) palm oil having a low peroxide content is mixed with acetone at a weight ratio of acetone:palm oil of from about 3:1 to about 7:1, and preferably from about 4:1 to about 6:1. The acetone:palm oil mixture is heated to a temperature above about 32° C. to melt the palm oil. This melted mixture is then slowly cooled with gentle agitation in a batch crystallizer at a rate of from about 0.1° to about 0.6° C./min. to cause crystallization of fat crystals. Cooling needs to be carefully controlled to prevent the formation of extremely fine crystals which turn the mixture into a thick, creamy, pudding-like mass. Such a pudding-like mass is difficult to remove from the crystallizer; subsequent separation of the fat crystals from the solvent phase is also extremely difficult. The Cloud Point of the mixture typically occurs at about 22° to about 23° C. with heavy crystallization typically occurring at about 6° C. After heavy crystallization is complete (about 15-20 minutes after it starts), the fat crystal/solvent mixture is lowered to a final fractionation temperature of from about −6° to about 7° C. (preferably from about 1° to about 3° C.) and then held at this temperature for about 0.5 to about 2 hours. The solvent phase containing the olein fraction is then filtered from the fat crystals (stearine fraction) using techniques well known in the art, e.g. Buchner funnel, vacuum drum filter.

In the second fractionation, this first stearine fraction is mixed with acetone at a weight ratio of acetone:fat of from about 4:1 to about 7:1 and preferably from about 4:1 to about 6:1. This acetone:fat mixture is heated to a temperature above about 40° C. (typically from about 40° to about 42° C.) to melt the fat. This melted mixture is then carefully cooled with gentle agitation at a rate of from about 0.1° to about 0.6° C./min. in a batch crystallizer to cause crystallization of fat crystals. The Cloud Point of this mixture typically occurs at about 25° to about 32° C. with heavy crystallization typically occurring at about 11° to about 12° C. After heavy crystallization is complete, the fat crystal/solvent mixture is lowered to a final fractionation temperature of from about 4° to about 7° C. and then held at this temperature for about 0.5 to about 2 hours. The solvent phase containing a second olein fraction is then filtered from the fat crystals (second stearine fraction) by art-recognized techiques.

The second stage of this preferred process also involves two solvent fractionations. In the first fractionation, the second stearine fraction is mixed with acetone at a weight ratio of acetone:fat of from about 5:1 to about 8:1, and preferably from about 6:1 to about 7:1. The acetone:fat fraction mixture is heated to a temperature above about 40° C. (typically from about 40° to about 42° C.) to melt the fat. This melted mixture is then slowly cooled with gentle agitation in a batch crystallizer at a rate of from about 0.1° to about 0.7° C./min. to cause crystallization of the fat crystals. The Cloud Point of the mixture typically occurs at about 27° to about 32° C. with heavy crystallization typically occurring at about 11° to about 12° C. After heavy crystallization is complete, the fat crystal/solvent mixture is lowered to a final fractionation temperature of from about 0° to about 7° C. (typically from about 4° to about 7° C.) and held at this temperature for about 0.5 to about 2 hours. The solvent phase containing the olefin fraction is then filtered from the fat crystals (third stearine fraction) by art-recognized techniques. In the second fractionation, the third stearine fraction is solvent fractionated using the same processing conditions as the first fractionation in the second stage to provide a fourth stearine fraction.

In the third stage, the fourth stearine fraction is mixed with acetone at a weight ratio of acetone:fat of from about 3:1 to about 6:1, and preferably from about 4:1 to about 5:1. The acetone:fat mixture is heated to a temperature above about 40° C. (typically from about 40° to about 45° C.) to melt the fat. This melted mixture is then slowly cooled with gentle agitation in a batch crystallizer at a rate of from about 0.2° to about 0.8° C./min. to cause crystallization of fat crystals (fifth stearine fraction). The Cloud Point of this mixture typically occurs at about 30° to 32° C. with gradual crystallization occurring from the Cloud Point temperature to about 21° to about 22° C. The fat crystal/solvent mixture is held at this temperature for about 0.5 to about 2 hours. The fifth stearine fraction is then filtered away from the solvent phase containing the olefin fraction by art-recognized techniques. The solvent is then evaporated from the olein fraction to yield the confectionery fat.

One such confectionery fat derived from palm oil using acetone as the solvent in this preferred triple stage fractionation process is described as follows:

A 1260 g. portion of refined, bleached, deodorized (RBD) whole palm oil was charged into an 8 l. capacity batch crystallizer with 5040 g. of dry acetone (acetone:palm oil weight ratio of 4:1). The mixture was warmed to about 36° C. to melt the RBD palm oil. This mixture was then slowly cooled at a rate of 0.2° C./min. using a Lauda/Brinkman circulating bath in conjunction with a Neslab U-Cool. The Cloud Point of the mixture was observed at about 23° C. Heavy crystallization occurred at 6.2° C. after about 10 minutes at that temperature. The temperature of the mixture was then lowered to 6.1° C. (total elapsed time to this point of about 3 hours) and then held at 5.7° to 6.1° C. for about 30 minutes. The mixture was then lowered to a temperature of 2.1° C. and held at 2.1° to 2.7° C. for about 30 minutes. The fat crystals were filtered with a Buchner funnel (pre-cooled to 0° C.) and then washed with about 1000 ml. of cold acetone (temperature 1.7° C.). These crystals were then air-dried to yield 490.7 g. of a stearine fraction (S-1A). The filtrate and wash was evaporated to yield 729.2 g. of an olein fraction (O-1A).

A 486.7 g. portion of the S-1A stearine fraction and 2000 g. of acetone were charged into the crystallizer (acetone:fat weight ratio of 4:1) and warmed to about 41° C. to melt the stearine fat crystals. This mixture was then cooled slowly (rate of 0.2° C./min.) with the Cloud Point occurring at about 25° C. Heavy crystallization occurred at about 12° C. (total elapsed time to this point of about 2.5 hours). The temperature was then lowered to 6.1° C. and held at 4.5° to 6.1° C. for one hour. The fat crystals were filtered from the solvent phase with a precooled Buchner funnel and washed with 1000 ml. of cold acetone. These fat crystals were air-dried to yield 366.8 g. of a stearine fraction (S-1B). The solvent present in the filtrate and wash was evaporated to yield 141.6 g. of an olein fraction (O-1B).

A 361.2 g. portion of the S-1B stearine fraction and about 2200 g. of acetone (acetone:fat weight ratio of 6:1) was charged to the crystallizer and then warmed to approximately 45° C. to melt the stearine fat crystals. The temperature of this mixture was then cooled slowly (rate of 0.2° C./min.) with the Cloud Point occurring at about 27° C. Heavy crystallization occurred at about 11.8° C. (total elapsed time to this point of about 2 hours). The temperature of the mixture was then lowered to 6.1° C. and held at 4.4° to 6.0° C. for one hour. The fat crystals were filtered from the solvent phase with a precooled Buchner funnel and washed with about 1000 ml. of cold acetone. The fat crystals were air-dried to yield 327.6 g. of a stearine fraction (S-2A). The solvent in the filtrate and wash was evaporated to yield 32.6 g. of an olein fraction (O-2A).

A 322.0 g. portion of the S-2A stearine fraction was charged with 1930 g. of acetone (acetone:fat weight ratio of 6:1) to the crystallizer and the mixture then warmed to about 42° C. to melt the stearine fat crystals. This mixture was then cooled slowly (rate of 0.3° C./min.) with the Cloud Point being observed at about 28° C. Heavy crystallization occurred at about 12° C. (total elapsed time to this point of about 2 hours). The temperature of the mixture was then lowered to 6.1° C. and held at 4.5° to 6.0° C. for one hour. The fat crystals were filtered from the solvent phase with a precooled Buchner funnel and then washed with about 1000 ml. of cold acetone. The fat crystals were then air-dried to yield 302.4 g. of a stearine fraction (S-2B). The solvent present in the filtrate and wash was evaporated to yield 18.2 g. of an olein fraction (O-2B).

A 296.7 g. portion of the S-2B stearine fraction was charged to the crystallizer with 1200 g. of acetone (acetone:fat weight ratio of 4:1). This mixture was warmed to about 41° C. to melt the stearine crystals. This mixture was then cooled (rate of 0.3° C./min) with the Cloud Point being observed at about 30° C. The temperature of the mixture was then lowered to 22.2° C. and held at 21.8° to 22.0° C. for one hour. The fat crystals were filtered from the solvent phase with a Buchner funnel and then air-dried to yield 122.1 g. of a third stearine fraction (S-3). The solvent present in the filtrate was evaporated to yield 173.4 g. of the desired confectionery fat (O-3).

The triglyceride composition of the various stearine and olein fractions, as measured by Argentation, are presented in the following table:

| Fraction | Glycerides (%) | | | |
|---|---|---|---|---|
| | SSS | SOS | SSO | SOO/OOO/SLS/other |
| RBD palm oil | 4.2 | 31.2 | 4.2 | 55.4 |
| S-1A | 9.9 | 65.9 | 5.8 | 16.9 |
| O-1A | 0.0 | 7.3 | 3.6 | 78.3 |
| S-1B | 19.6 | 59.7 | 5.9 | 14.8 |
| O-1B | 0.1 | 18.3 | 8.9 | 72.7 |
| S-2A | 21.4 | 71.4 | 5.4 | 1.8 |

-continued

| Fraction | Glycerides (%) | | | |
|---|---|---|---|---|
| | SSS | SOS | SSO | SOO/OOO/SLS/other |
| O-2A | 0.0 | 45.5 | 13.6 | 38.6 |
| S-2B | 22.0 | 73.4 | 3.7 | 0.9 |
| O-2B | 0.0 | 46.9 | 31.2 | 21.9 |
| S-3 | 58.3 | 38.8 | 2.9 | 0.0 |
| O-3 | 1.8 | 91.7 | 4.6 | 1.8 |

A preferred embodiment of this three stage fractionation process involving an isopropanol:hexane mixture (3:1 weight ratio) as the solvent is a follows: whole RBD palm oil is mixed with the solvent at a solvent:palm oil ratio of about 4:1 to about 6:1. This mixture is then heated to a temperature of from about 31° to about 32° C. to melt the palm oil. This melted mixture is then slowly cooled at a rate of from about 0.1° to about 0.7° C./min. in a batch crystallizer to cause crystallization of the fat crystals. The Cloud Point typically occurs at about 24° C. with heavy crystallization typically occurring at about 4° C. After heavy crystallization, the fat crystal/solvent mixture is then lowered to a final fractionation temperature of from about −1° to about −20° C. and then held at this temperature for about 0.5 to about 2 hours. The solvent phase is then filtered away to yield a first stearine fraction.

This first stearine fraction is then solvent fractionated five times (fractionations 2 to 4, remove SUU/UU-U/SLS triglycerides, fractionations 5 and 6 remove SSO triglycerides) to finally yield a sixth stearine fraction using the following fractionation conditions:

| Fractionation | Solvent:fat ratio | Final Fractionation Temp (°C.) |
|---|---|---|
| 2 | 4:1 | −1 to 0 |
| 3 | 6:1 | 0 |
| 4 | 8:1 | 2 |
| 5 | 8:1 | 5 |
| 6 | 10:1 | 5 |

In these fractionations, the mixture of solvent and fat is melted at a temperature above about 36° C. (typically about 36° to about 39° C.). The Cloud Point is typically reached at a temperature of from about 25° to about 27° C. with heavy crystallization typically occurring at a temperature of from about 7° to about 8° C. The rate of cooling is from about 0.1° to about 0.2° C./min.

This sixth stearine fraction is then mixed with the solvent at a solvent:fat ratio of from about 6:1 to about 8:1. This solvent:fat mixture is then heated to a temperature above about 39° C. to melt the fat. This melted mixture is then slowly cooled with gentle agitation at a rate of from about 0.1° to about 0.3° C./min. The Cloud Point of the mixture is typically reached at about 28° C. Crystallization is gradual as the solvent:fat mixture is lowered to a final fractionation temperature of about 21° C. and held at this temperature for about 0.5 to about 2 hours. A seventh stearine fraction (SSS triglyceride) is filtered away the solvent phase containing the desired confectionery fat. The confectionery fat is then obtained by evaporating the solvent from the olein fraction.

The previously described embodiments for fractionating palm oil involve batch crystallizations. Suitable confectionery fats can also be obtained by continuous fractionation of palm oil. This continuous process permits greater processing speeds, i.e. increases throughput. Also, this continuous process provides better control of fat crystal size and filterability of the fat crystals from the solvent.

In this continuous process, one or more scraped surface heat exchangers (SSHE) are used instead of a batch crystallizer. Each SSHE has a small diameter shaft to which are attached scrapers for removing solids from the interior surface of the SSHE. The shaft typically rotates at a relatively slow speed (e.g. from 15 to 30 rpm).

The melted fat in the solvent is precooled to just above the Cloud Point and is then fed into the first SSHE which is cooled by circulating a coolant (e.g. ethylene glycol) at the appropriate temperature through the jacket. Fat crystals (stearine fraction) are formed; any fat crystals which form on the cooled interior surface of the SSHE are scraped off. The solvent containing the crystallized fat from the first SSHE is then fed to the remaining SSHEs. The remaining SSHEs are cooled to lower temperatures than the first SSHE. Additional crystallization of the fat occurs in these other SSHEs.

When the solvent:fat crystal mixture exits the final SSHE, it is then filtered by a rotary drum pressure filter. This filter has a housing and a concentric filtering drum which rotates within the housing. The housing is divided into several chambers which permit various operations (e.g. filtering, washing, removing residual olein) to be performed as the drum is rotated. The drum has a plurality of filter cells formed in the periphery. At the base of each filter cell is a fabric filter medium.

The solvent:fat crystal mixture is fed into one of the chambers in the housing. The solvent containing the olein fraction is filtered away by the filter medium, leaving the fat crystals (stearine fraction) behind in the filter cell. When the drum is rotated to the next chamber, this wet stearine fraction is washed with fresh solvent. When the drum is rotated to the next chamber, residual olein adhering to the washed stearine fraction is removed by blowing in nitrogen. The drum is then rotated to the final chamber where the stearine fraction (as a cake) is ejected from the filter cell. The SSHEs, and the rotary filter are used in each fractionation stage. In the third fractionation stage, the olein fraction is filtered from the stearine fraction and then the solvent is evaporated to yield the desired confectionary fat.

An embodiment of this continuous process is described as follows:

Whole RBD palm oil is fractionated using acetone as the solvent. The following fractionation conditions are used:

| Fractionation | Acetone:Fat Ratios | Fractionation Temp. (°C.) | Fraction Retained |
|---|---|---|---|
| 1 | 4:1 | 2 | Stearine |
| 2 | 4:1 | 6 | Stearine |
| 3 | 6:1 | 4 | Stearine |
| 4 | 6:1 | 4 | Stearine |
| 5 | 4:1 | 21 | Olein |

During each fractionation, an Armstrong continuous crystallizer is used. This crystallizer comprises two SSHEs hooked up in series. Each SSHE is 15 ft. (4.6 m.) long, has a net volume of 2.7 ft.$^3$ (0.08 m.$^3$) and had a rotating shaft to which are attached phenolic scraper blades by leaf springs. The flow rate through the crystallizer is 288 lbs. (131 kg.) per hour, giving a nominal residence time of 57 minutes through the entire crystallizer, i.e. both SSHEs.

The acetone:fat crystal mixture is then pumped to a BHS Fest Rotary Pressure Filter to separate the fat crystals (stearine fraction) from the solvent (olein fraction). This Fest filter is set up to provide the following operations: (1) a filtering section; (2) a cake (stearine fraction) washing section using precooled fresh acetone; (3) a nitrogen blowing section to remove residual olein from the cake; (4) a cake removal section where the cake is discharged from the filter cell; and (5) a filter wash section where the filtering medium is washed with acetone as necessary. In fractionations 1-2 (first stage) and 3-4 (second stage) the cake is retained for further processing. In fractionation 5 (third stage), the filtrate from operation (1) is retained and the acetone then evaporated to yield the desired confectionery fat.

Confectionery Fat Compositions

A. Fat Component

The confectionery fat (hereafter POP fat) obtained by the process of the present invention is useful in the confectionery compositions of U.S. application Ser. No. 684,515 to Joseph S. Baker and Phillip F. Pflaumer, filed Dec. 21, 1984. The key component of these compositions is the fat component. As used herein, the term "fat component" refers to all triglycerides, diglycerides and monoglycerides present in the confectionery composition. For example, if chocolate-liquor is used to formulate chocolate compositions, the cocoa butter portion is included as part of the fat component. If milk solids are used, for example, in milk chocolate, any butter fat present is included as part of the fat component. The fat component can comprise a portion or all (100%) of the confectionery composition.

Other than for cocoa butter or butter fat, the fat component usually consists entirely of a fat having a low St:P ratio (about 0.2 or less). This low St:P ratio fat can be made by blending the POP fat with a fat high in SUU/UUU/SLS, and especially POO, triglycerides. The amount of the POP and SUU/UUU/SLS fat blended together can be varied so as to achieve the desired triglyceride composition for the fat component. Typically, the POP fat comprises from about 80 to 100% by weight of the fat blend, while the SUU/UUU/SLS fat comprises from 0 to about 20% by weight of the fat blend.

The liquid SUU/UUU/SLS triglyceride portion of this low St:P ratio fat can be obtained from various sources, including SUU/UUU/SLS triglycerides produced synthetically. Such liquid triglycerides are usually derived from naturally occurring oils. Suitable oils high in such liquid triglycerides include cottonseed oil, soybean oil, sunflower oil, corn oil, peanut oil, safflower oil, and the like. These liquid triglycerides are preferably derived from the olein fraction(s) obtained in the first stage of the present triple stage fractionation of palm oil. These olein fractions can be used as is, or are preferably fractionated to obtain a higher percentage of the more desirable POO triglycerides. In addition to providing liquid triglycerides, these olein fractions also contain desirable antioxidant tocopherols and trienols.

The fat component usually comprises from about 30 to 100% by weight of the fat or fat blend having the low St:P ratio, the remainder of the fat component (i.e. from 0 to about 70% by weight) typically being cocoa butter. This cocoa butter in the fat component can be either added fat or more typically is present in the source of (chocolate) flavor used in the composition. Butter fat or butter oil (e.g. from milk solids) can also be included at up to about 20% by weight of the fat component. For chocolate compositions which do not use chocolate-liquor (e.g. chocolate flavored coatings), the fat or fat blend having the low St:P ratio comprises from about 50 to 100% by weight of the fat component, the remainder (i.e., from 0 to about 50% by weight) being cocoa butter and/or butter fat.

In terms of glyceride composition, this fat component comprises, by weight:
(a) at least about 70% SOS triglycerides;
(b) from about 4 to about 20% combined SUU/UUU/SLS triglycerides;
(c) about 8% or less SLS triglycerides;
(d) about 9.5% or less SSO triglycerides;
(e) about 2.5% or less SSS triglycerides; and
(f) about 4% or less other glycerides
wherein S is stearic (St) or palmitic (P); and U is oleic (O) or linoleic (L). The St:P weight ratio is about 0.8 or less.

In terms of the properties imparted to the confectionery composition, the SOS triglycerides and combined SUU/UUU/SLS triglycerides are by far the most important. The SOS triglycerides, i.e. the StOSt, POSt and POP, triglycerides, determine the mouth melt properties of the fat composition. The combined SUU/UUU/SLS triglycerides, more appropriately referred to as the "liquid" triglycerides, determine the firmness of the fat composition, and to some degree its final melting temperature.

The SOS triglycerides are present in the composition at at least about 70% by weight of the fat component. For fat components where butterfat is not present, these SOS triglycerides are typically present at at least about 80% by weight, and preferably at at least 85% by weight. The combined SUU/UUU/SLS triglycerides are present at from about 4 to about 20% by weight of the fat component. For chocolate candy executions having optimum firmness and "snap", these triglycerides are present at preferably from about 8 to about 15% by weight. Usually, the SUU triglycerides comprise at least about 50% by weight, and preferably at least about 80% by weight, of the combined SUU/UUU/SLS triglycerides.

Another key aspect of the fat component is the minimized level of SLS, SSO and SSS triglycerides. It has been determined that these triglycerides are responsible for the lack of temperability and compatibility of a fat with cocoa butter when present above certain critical levels. The maximum level of SLS triglycerides is about 8% or less by weight of the fat component. Typically, the SLS triglycerides are present in the fat component at about 5% or less by weight. The maximum level of SSO triglycerides is about 9.5% or less by weight of the fat component. Typically, the SSO triglycerides are present in the fat component at about 6% or less by weight. The maximum level of SSO triglycerides which can be tolerated varies depending upon the St:P ratio of the fat component, and the amount of butterfat (or fats having butterfat-like triglycerides) in the fat component. For example, as the St:P ratio reaches a maximum of about 0.8, the maximum level of SSO triglycerides which can be tolerated is about 6% or less by weight. Also, as the amount of butterfat reaches a maximum of about 20% by weight, the maximum level of SSO triglycerides which can be tolerated is about 5% or less by weight. For the SSS triglycerides, the maximum level which can be tolerated is about 2.5% or less by weight, and is preferably about 2% or less by weight.

Other glycerides can be present at about 4% or less by weight of the fat component. As used herein, the term "other triglycerides" refers to SOS, SUU, UUU, SLS, SSO and SSS triglycerides wherein S is neither palmitic (P) nor stearic (St) or wherein U is neither oleic (O) nor linoleic (L). Also included in this term are the saturated-saturated-linoleic (SSL) and the unsaturated-saturated-unsaturated (USU) triglycerides, as well as the mono- and diglycerides.

Of these other glycerides, it has been found to be particularly important to minimize the level of 1,2- and 1,3-diglycerides in the fat component. This is especially true when increasing levels of butter fat are used, e.g. for milk chocolate applications. The maximum level of diglycerides should be about 2% or less by weight of the fat component. Typically, the diglycerides are present at about 1% or less by weight. The level of diglycerides can be determined by measuring the Carbon Number Profile (hereafter CNP) of the fat component if butter fat is not present. (The method for determining the CNP of the fat component is described hereafter in the Analytical Methods section of the present application. The key diglycerides based on palmitic, stearic, oleic and linoleic fatty acid residues have CNP numbers of 32, 34 or 36.). If butter fat is present, the level of diglycerides can be determined by Argentation.

An important aspect of the fat component is its St:P weight ratio. This ratio indirectly measures the proportion of POP, POSt and StOSt triglycerides present in the fat component. It is these triglycerides which determine the mouth melt characteristics of the confectionery composition. This St:P ratio is about 0.8 or less, preferably about 0.5 or less, and most preferably about 0.3 or less. The St:P ratio often depends upon how much cocoa butter (St:P ratio of about 1.3) is present as either added fat or more typically from the source of (chocolate) flavor used. For those confectionery compositions where the fat component contains minimal or no levels of cocoa butter, the St:P ratio can be about 0.2 or less.

The weight percentages of the stearic (St), and palmitic (P), as well as the oleic (O) and linoleic (L), fatty acid residues of the various triglycerides are measured by determining the Fatty Acid Composition (hereafter FAC). The FAC for the triglycerides of the fat component can be obtained by the method described hereafter under the Analytical Methods section of the present application.

In addition, the level of StOSt triglycerides present in the fat component is desirably minimized for improved mouth melt properties. The StOSt triglycerides have a significantly higher melting point than the POP or POSt triglycerides. As such, minimizing the level of StOSt triglycerides results in a much sharper melting mixture of SOS triglycerides at below body temperatures. These StOSt triglycerides are typically present at about 20% or less by weight of the SOS triglycerides, preferably at about 15% or less by weight, and most preferably at about 10% or less by weight. The level of StOSt triglycerides can be determined by measuring the CNP of the SOS triglyceride fraction separated by Argentation. (The CNP numbers of the POP, POSt and StOSt triglycerides are 50, 52 and 54, respectively).

B. Flavor Confectionery Fat Compositions

1. Amount of Fat Component

In flavored confectionery compositions, the fat component usually comprises from about 20 to about 45% by weight of the composition. The particular amount of the fat component which is suitable can depend on the application for which it is used. For molding applications, the fat component preferably comprises from about 29 to about 33% by weight of the composition. For some enrobing applications, the fat component preferably comprises from about 33 to about 40% by weight of the composition. For chocolate depositing applications (e.g. chocolate chips), the fat component preferably comprises from about 25 to about 32% by weight of the composition.

2. Flavor Component

In addition to the fat component, these flavored compositions comprise a flavor enhancing amount of a flavor component. The flavor component comprises flavor constituents which impart positive flavor characteristics, and optionally nonflavor constituents normally present in flavor compositions, e.g. flavor carriers. As used herein, the term "flavor enhancing amount" refers to an amount of the flavor component sufficient to impart positive flavor characteristics to the confectionery composition. As such, the amount of the flavor component sufficient to be "flavor enhancing" can depend on the flavor source used, the flavor effects desired and like factors. Typically, the flavor component (nonfat constituents) comprises from about 0.1 to about 30% by weight of the composition.

A variety of flavor sources can be used to form the flavor component. A particularly preferred flavor source is a chocolate flavor. Suitable chocolate flavors can be derived from chocolate-liquor, or cocoa powder. These chocolate materials (fat plus nonfat ingredients) are typically included at from about 10 to about 40% by weight of the composition. As used herein, "chocolate-liquor" refers to the solid or semi-plastic food prepared by finely grinding cacao nibs. Chocolate-liquor usually contains from about 50 to about 58% by weight cocoa butter fat. As used herein, "cocoa powder" refers to the residual material remaining after part of the cocoa butter fat has been removed from ground cacao nibs. Cocoa powder usually contains from about 10 to about 22% by weight cocoa butter fat. (As previously stated, this cocoa butter fat present in chocolate-liquor and cocoa powder is included as part of the fat component.) Other sources of flavor include vanillin, ethyl vanillin, spices, coffee, brown sugar, etc., as well as mixtures of these flavors.

3. Sugar and Sugar Alcohols

For flavored confectionery compositions, one particularly important ingredient is sugar. Sugar is typically present in such compositions at from about 40 to about 60% by weight of the composition. Especially for compositions used to make chocolate, the source of sugar needs to be essentially dry. Sources of sugar include sucrose, fructose, glucose and mixtures thereof. The sugar usually has a maximum particle size of from about 0.0004 to about 0.0016 inches (from about 10 to about 40 microns) in finished chocolate products.

For diet compositions, in particular diet chocolate, the sugar can be completely or partially substituted with a sugar alcohol. Suitable sugar alcohols include sorbitol, xylitol, mannitol and mixtures thereof.

4. Milk solids

Especially in milk chocolate applications, the flavored confectionery composition can also include milk solids (essentially dry), usually at from about 12 to about 20% by weight of the composition, and typically at from about 14 to about 18% by weight. Suitable sources of essentially dry milk solids can be obtained from cream, milk, concentrated milk, sweetened condensed milk, skim milk, sweetened condensed skim milk, concentrated buttermilk, and the like. (As previously stated, any fat present in the milk solids, such as butterfat, is included as part of the fat component.)

5. Other Ingredients

Flavored confectionery compositions usually include an emulsifier to "wet" the sugar particles with the fat. Suitable emulsifiers include sorbitan monostearate, polysorbate 60, and particularly lecithin. These emulsifiers are usually present at up to about 1.5% by weight of the composition, and typically at up to about 0.5% by weight. Preferred levels of emulsifier are from about 0.3 to about 0.5% by weight. Other minor ingredients such as salt normally present in fat based confections can also be included.

D. Analytical Methods

1. Argentation

The positional isomer triglyceride composition of a fat can be determined by Argentation Thin Layer Chormatography. 20 cm. square, 250 micron layer thickness, silica gel G plates (Analtech, Newark, Del.) are used. The plates are prewashed for 2.5 to 3 hrs. by ascending treatment with chloroform/methanol (140 ml/70 ml) and air-dried. The plates are then sprayed with 2.5% aqueous solution of silver nitrate until evenly wet and activated in a forced-air oven (115° C.) for 60 min. After being cooled, the plates are used immediately or stored in a dust-free container and used within 24 hours.

The activated plate is prewashed by ascending development with hexane/ethyl ether/acetic acid (180 ml/20 ml/0.5 ml) for 30 to 40 min., air-dried and scored into 18 lanes 1 cm wide. A line is drawn across the top edge of the plate 2.5 cm from the top. For sample development, 50 ml. of water is poured into a metal development chamber and allowed to equilibrate while preparation of the sample is performed. The chamber is covered with saran wrap and a glass lid. The developing solvent, methylene chloride/toluene/acetic acid (28 ml/5 ml/0.05 ml), is prepared and stored in a glass-stopped, graduated cylinder.

A single sample is analyzed on each plate and the isomer composition is calculated by relative distribution. The sample is melted in a hot water bath, mixed and 400 mg. weighed into a 10 ml. volumetric flask. The dilution solvent, 1% acetic acid in chloroform, is added to the mark. Six dilutions are made from the original solution: (1) 2 ml diluted to 5 ml using the dilution solvent, (2) 2 ml diluted to 10 ml, (3) 1 ml diluted to 10 ml, (4) 0.5 ml diluted to 10 ml, (5) 0.25 ml diluted to 10 ml, and (6) 0.25 ml diluted to 25 ml. Aliquots are spotted on alternate lanes, leaving blank lanes for double beam densitometer scanning. Five microliter aliquots are spotted 2.5 cm from the bottom edge of the plate as follows: dilution (1) on lane 1; dilution (2) on lane 7;

dilution (3) on 9; dilution (4) on lane 11; dilution (5) on lanes 3 and 13; dilution (6) on lanes 5 and 15; and the original solution on lane 17. A standard solution containing a mixture of isomers (2 microg. each of tristearin, oleodistearin, dioleopalmitin, 2-oleo-1,3-distearin, and 3 -oleo-1,2-distearin) is spotted on lane 18. Lane 18 is used for reference and for determining the charring response for 2 microg. when scanning. (Densitometer readings are most accurate between 1 to 2 microg. of charred sample spot.)

Immediately after spotting the plate, the prepared development solvent is poured into a small metal tray placed in the bottom of the development chamber containing the water. The plate is set into the solvent tray and the cover replaced on the chamber. When the solvent reaches the upper line (30 to 40 min.), the plate is removed and air-dried for a few minutes. The dried plate is then sprayed with 20 ml. of 25% aqueous sulfuric acid and placed on a pre-heated (250°–260° C.) hot plate (Thermolyne Model 1P-A2245-M, 1 cm×33 cm×15 cm high) covered with ceramic cloth. After 15 to 20 min. charring, the plate is removed and allowed to cool.

The charred plate is then scanned at a wave length of 546 nm wiyh a Schoeffel densitometer (Model SD with SDC300 density computer) using the ratio mode. A Varian CDS 111C is used for integration. The individual isomer count value nearest to the 2 microg. count value on lane 18 is used for calculation. The response factor is assumed to be nearly identical for all isomers in this range. Averages of 2 lanes or more may be used depending on integration counts. Either single lane counts or average counts are used for totals, whichever is applicable. After proper identification and selection of all the isomers in the sample, the counts from the appropriate lane(s) are converted to the same basis. The conversion factors are: lane 1=40; lane 7=20; lane 9=10; lane 11=5; lanes 3 and 11=2.5; lanes 5 and 15=1; and lane 18=100. The converted counts are summed and normalized, yielding the relative distribution of the isomers in the fat sample.

B. Carbon Number Profile (CNP)

The CNP of a particular triglyceride composition can be determined by programmed temperature-gas chromatography using a short fused silica column coated with methyl silicone for analysis and characterization of the composition by molecular weight. The glycerides are separated according to their respective carbon numbers, wherein the carbon number defines the total number of carbon atoms on the combined fatty acid residues. The carbon atoms on the glycerol molecule are not counted. For example, the POP, POSt and StOSt triglycerides would have carbon numbers of 50, 52 and 54, respectively. Glycerides with the same carbon number will elute as the same peak. For example, a triglyceride composed of three C16 (palmitic) fatty acid residues will co-elute with triglycerides made up of one C14 (myristic), one C16 and one C18 (stearic) fatty acid residue or with a triglyceride composed of two C14 fatty acid residues and one C20 (arachidic) fatty acid residue.

Preparation of the fat sample for analysis is as follows: 1.0 ml. of a tricaprin internal standard solution (2 mg./ml. of methylene chloride) is pipetted into a vial. The methylene chloride solvent is evaporated using a steam bath under a nitrogen stream. Two drops of the fat sample (20 to 40 mg.) are pipetted into the vial. If the fat sample is solid, it is melted on a steam bath and stirred well to insure a representative sample. 1.0 ml. of bis(trimethylsilyltrifluoroacetamide) (BSTFA) is pipetted into the vial which is then capped. The contents of the vial are shaken vigorously and then placed in a heating block (temperature of 100° C.) for about 5 minutes.

For determining the CNP of the prepared fat sample, a Hewlett-Packard 5880A series gas chromatograph equipped with temperature programming, a flame ionization detector and a 2 m. long, 0.22 mm. diameter fused silica capillary column coated with a thin layer of methyl silicone (Chrompak CP-SIL 5) is used. The following instrument conditions are used with the gas chromatograph:

| Temperature program | |
|---|---|
| initial temp. | 165° C. |
| initial time | 0.5 min. |
| program rate | 25° C/min. |
| final temp. | 355° C. |
| final time | 5.0 min. |
| Detector Temp. | 365° C. |
| Injector Port Temp. | 365° C. |
| Septum Purge | 1 ml/min. |
| Inlet Pressure | 5 psi |
| Injection Volume | 1 microl. |
| Carrier Gas | helium |
| Split Vent Flow | 75 ml/min. |

The chromatographic peaks generated are then identified and the peak areas measured. Peak identification is accomplished by comparison of retention time of unknown peaks to those of pure glyceride standards previously programmed into the data system. The peak area as determined by the data system, along with the corresponding response factors ($R_f$), are used to calculate the percentage of glycerides having a particular Carbon Number ($C_N$) according to the following equation:

$$\%C_N = (\text{Area of } C_N \times R_f / S) \times 100$$

wherein S=sum of (Area of $C_N \times R_f$) for all peaks generated.

Response factors ($R_f$) are determined by comparing the actual responses of a mixture of pure glycerides of various Carbon Numbers (below) to the known amounts of each glyceride in the mixture. A glyceride generating an actual response greater than its actual amount has a response factor less than 1.0; likewise, a glyceride generating a response less than that of its actual amount has a response factor of greater than 1.0. The typical mixture of standard glycerides used (in a methylene chloride solution) to generate response factors is as follows:

| Component | Carbon No. | Amount (mg./ml.) |
|---|---|---|
| palmitic acid | 16 | 0.5 |
| monopalmitin | 16 | 0.5 |
| monostearin | 18 | 0.5 |
| dipalmitin | 32 | 0.5 |
| palmitostearin | 34 | 0.5 |
| distearin | 36 | 0.5 |
| tripalmitin | 48 | 1.5 |
| dipalmitostearin | 50 | 1.5 |
| distearopalmitin | 52 | 1.5 |
| tristearin | 54 | 1.5 |

C. Fatty Acid Composition (FAC)

The FAC of a particular triglyceride composition can be determined by gas chromatographic analysis performed on the corresponding methyl ester mixtures. The fatty acid residues attached to the glycerides are converted to the respective methyl esters and injected directly into the gas chromatograph where the components are separated by chain length and degree of unsaturation. The peak areas for each methyl ester can be determined either graphically or electronically.

Prior to gas chromatographic analysis of the fat sample, the fatty acid residues attached to the glyceride are converted to the respective methyl esters as follows: Fifty ml. of sodium methoxide reagent (3 g. of sodium per l. of methanol) is added to 10-15 g. of the fat sample. This mixture is boiled with stirring for 3-5 minutes. After boiling, 25 ml. of saturated NaCl-0.5% HCl solution is added to the mixture. After addition of the NaCl-HCl solution, 50 ml. of hexane is added. The mixture is then shaken and the hexane layer (top) decanted through filter paper containing about 5 g. of anhydrous sodium sulfate. A sample is taken from the filtered hexane layer for analysis of the methyl esters. The hexane is then evaporated from the sample.

To determine the FAC of the prepared fat sample, a Hewlett-Packard 5770 series gas chromatograph equipped with temperature programming, thermal conductivity detector and a 10 ft. long, ¼ inch diameter stainless steel column packed with a preconditioned packing of 10% DEGS-PS on 100/120 mesh Chromosorb WHP is used.

The following instrument conditions are used with the gas chromatograph:

| Detector | 300° C. |
|---|---|
| Carrier Gas | helium |
| Carrier Gas Flow | 60 ml./min. |
| Injector Temp. | 300° C. |
| Injection Volume | 1 microl. |
| Column Temperature | 215° C. |

The chromatographic peaks generated are then identified and the peak areas measured. Peak identification is accomplished by comparison to known pure methyl esters previously programmed into the data system. The peak area as determined by the data system is used to determine the percentage of the particular fatty acid (FA) according to the following equation:

$$\% FA = (\text{Area of } FA \times \sqrt{\text{Molecular Weight of } FA})/S \times 100$$

wherein S = sum of (Area of $FA \times \sqrt{\text{Molecular Weight of } FA}$) of all peaks generated

Chocolate Making

The flavored confectionery compositions are particularly suitable for making chocolate. Some typical formulations for making milk chocolate, sweet dark chocolate, and chocolate coatings are as follows:

| Ingredient | Milk Chocolate % | (% Fat)** | Sweet Dark Chocolate % | (% Fat)** | Chocolate Coating % | (% Fat)** |
|---|---|---|---|---|---|---|
| Sugar | 48 | — | 48 | — | 48 | — |
| Chocolate Liquor | 14 | (7) | 38 | (19) | — | — |
| Cocoa Powder | — | — | — | — | 12 | (1.5) |
| Milk Solids | 18 | (5) | — | — | 0-10 | (0-2) |
| Added Fat* | 20 | (20) | 14 | (14) | 30 | (30) |
| Lecithin | 0.3-0.5 | | 0.3-0.5 | | 0.3-0.5 | |
| Salt & Flavors | As desired | | As desired | | As desired | |

*Low St:P ratio fat
**Approximate based on total formulation

The total fat present in the chocolate formulation can be adjusted to provide the desired viscosity. For molding, the total fat can preferably in the range of from about 29 to about 33% by weight of the formulation; for enrobing, this total fat is preferably in the range of from about 33 to about 40% by weight. The ratios of sugar, chocolate liquor (or cocoa powder), and milk solids can vary depending upon the composition desired.

The flavored confectionery compositions can be made into chocolate by standard techniques for making chocolate. The initial step in chocolate making involves mixing the ingredients to "wet" them with the added fat and to provide a consistency suitable for the subsequent refining step. During this mixing step, sugar, milk solids, salt, any cocoa powder and ¼ to ⅓ of the total lecithin are added to a mixer. Then, the melted chocolate-liquor (if any) and a portion of the added fat, typically so as to provide about 22-23% total fat in the formulation, are added to the mixer. These ingredients are stirred for a period of time sufficient to "wet" the dry ingredients with the fat. The particular time period is not critical and is typically about 15 minutes. During this mixing step, the contents of the mixer are heated to a temperature of about 120° F. (49° C.). Contact with moisture is avoided during this step. The consistency of the chocolate formulation after mixing is typically that of soft putty.

After mixing, the chocolate formulation is refined to reduce the solids, in particular the sugar, to the desired maximum particle size, typically from about 0.008 to about 0.0016 inches (from about 20 to about 40 microns). This refining step also coats the solids with the fat. Typically, four or five water cooled rolls, each progressively faster in speed, are used to refine the formulation. Pressure between the rolls is adjusted to achieve the desired fineness for the solids. As in the mixing step, contact with moisture is avoided during refining. In particular, the rolls are not cooled to or below the dewpoint of ambient air. The consistency of the chocolate after refining is that of flakes or a heavy putty.

After refining, the chocolate formulation is dry-conched to remelt and redistribute the fat to the surface of the solids in the refined mix. The moisture content of the mix is reduced to about 1% or less. Certain volatile compounds are also removed which improves the flavor. In this dry-conching step, flakes from the refining step are first broken into a powdery mass in a mixer which is heated to at least about 120° F. (49° C.). When this temperature is reached, the fat is added as needed such that the consistency of the mass is that of very soft putty. The fat content of the mass at this point is typically on the order of about 28%. The contents of the mixer can be adjusted to a temperature of from about 120° to about 150° F. (from about 49° to about 66° C.) for milk chocolate and to a temperature of from about 120° to about 180° F. (from about 49° to about 82° C.) for sweet dark chocolate or chocolate coatings. The total time required for this dry-conching step can range from about 3 to about 72 hours.

After dry-conching, the chocolate formulation is wet-conched. During wet-conching, the remaining fat and lecithin are added to adjust the viscosity of the mass to that required for the intended application. Mixing is continued, typically for about 15 to about 60 minutes, during wet-conching. The temperature of the mass is also typically reduced to about 120° F. (49° C.).

After wet-conching, the chocolate mass is then tempered to form the critical beta-3 seed crystals in sufficient quantity so that the fat crystallizes almost entirely into the beta-3 phase upon cooling during molding or enrobing. During this tempering step, the chocolate mass is adjusted as necessary to a temperature of from about 104° to about 120° F. (from about 40° to about 50° C.) to destroy any fat crystals present. The liquid chocolate is then carefully cooled to a temperature of from 22° to 25° C. to start formation of beta-prime fat crystals. Formation of these fat crystals can be detected by an increase in viscosity of the chocolate or by a leveling off or rise in the temperature of the chocolate due to the heat of crystallization. During formation of these beta-prime fat crystals, a small portion thereof transform to the desired beta-3 phase to form the necessary beta-3 seed crystals. After the beta-3 seed crystals have formed, the chocolate is then reheated (e.g. to a temperature of from 84° to 86° F. (from 29° to 30° C.)) in order to melt all of the beta-prime fat crystals, while leaving unmelted the desired beta-3 seed crystals. (As the St:P ratio of the fat decreases to 0.2 or less, the reheating temperature is generally 1° to 2° C. lower than in standard chocolate making). During this melting process, the viscosity of the mass falls sharply to attain a fluidity approximately that of the mass prior to tempering.

After tempering, the molten chocolate mass can then be molded or used for enrobing. During this molding-/enrobing step, the molten chocolate (temperature of from 84° to 86° F. (29° to 30° C.)) is cooled to a temperature of about 60° F. (15.7° C.) to solidify the chocolate. The solid chocolate or chocolate enrobed product is then typically stored at a temperature of from about 60° to about 65° F. (about 15.7° to about 18.3° C.) to prevent bloom and textural changes. This molded/enrobed chocolate can be used in a number of different applications, including chocolate candy bars, chocolate chips, chocolate enrobed cookies, and the like.

Using these compositions, a milk chocolate candy bar was made as follows:

The formulation used to prepare this milk chocolate candy bar is presented in the following table:

| Ingredient | % | Wt. (g) |
| --- | --- | --- |
| Sucrose | 49.65 | 993.0 |
| Milk solids | 15.0 | 300.0 |
| Vanillin | 0.05 | 1.0 |
| Chocolate liquor | 15.0 | 300.0 |
| Add fat* | 18.0 | 360.0 |
| Butterfat | 2.0 | 40.0 |
| Lecithin | 0.3 | 6.0 |
| | 100.0 | 2000.0 |

*95% POP fat, 5% CRISCO Oil

The dry ingredients (sucrose, milk solids and vanillin) were weighed together and then mixed in a Hobart Mixer, Model C-100 set at speed No. 1. The chocolate liquor, 200 g of the added fat (23–24% total fat in the mixture at this point) and ⅓ of the lecithin (2.0 g.) were weighed together, melted, mixed and then added to the dry ingredients. With continual mixing, and occasional heating supplied by a hot plate, the mixture became a soft, putty-like mass in about 15 minutes.

This soft, putty-like mass was refined by feeding it slowly into a 4-roll refiner. The rolls were water-cooled to about 70° to 72° F. (21.1° to 22.2° C.) which was above the dew point of the ambient air. The rolls were hydraulically pressurized to obtain an acceptable sugar particle size. The rolls were successively faster in speed with the chocolate mixture being automatically scraped from the upper roll as fine, thin flakes. The weight of flakes recovered was 1739.0 g. compared to the initial mix weight of 1796.0 g. The ratio of these weights provided a correction factor of 0.968 which was used in calculating the amounts of fat and lecithin to be added in subsequent steps.

The refined chocolate was then placed into a 3-quart jacketed mixing bowl. An amount (116.2 g.) of fat required to bring the chocolate mass to a total fat content of 28 to 29% was melted and then added. The chocolate mass was then conched in a Hobart Mixer, Model C-100 set at speed No. 2. Water having a temperature of 125° F. (51.7° C.) was circulated through the jacket of the mixing bowl. This conching step was continued for a period of 48 hours.

In the wet-conching step, 38.7 g. of added fat and 38.7 g. of butterfat were melted and then added (total fat content of the mass now 32 to 33%), along with the final ⅔ (3.9 g.) of the lecithin. The mass was mixed for a period of 15 minutes at a temperature of 125° F. (52° C.).

Using a jacketed tempering pot (1.5 l. capacity) equipped with a fixed-speed agitator (40 rpm) and a temperature probe, and a series of water baths set at about 55° C., about 32° to 34° C., and about 20° to 21° C., the chocolate mass was tempered, with continual temperature monitoring and viscosity observation, as follows: The chocolate mass was warmed to 49° C. by circulating water from the 55° C. bath through the jacket of the pot. The warmed mass was then cooled, first to 35° C. by circulating water from the 32° to 34° C. bath through the jacket, and then to the temperature of crystallization (22.8° C.) by circulating water from the 20° to 21° C. bath through the jacket. When crystallization had occurred, as evidenced by an increase in viscosity, loss of shiny appearance, and, most importantly, by a rise in temperature of the chocolate mass of approximately 0.1° C., the water from the 32° to 34° C. bath was again circulated through the jacket. As a result, the chocolate mass was reheated to the necessary temperature of 29.0° C. to melt the beta-prime crystals, leaving behind the desired beta-3 seed crystals.

The molten chocolate mass was then transferred from the tempering pot to a 30-bar mold, 9 in. (22.9 cm) wide by 22 in. (55.9 cm) in length and approximately 0.3 cm in depth. The temperature of the mold was 75° to 80° F. (23.9° to 26.7° C.). The chocolate in the mold was then cooled in a cooling tunnel by air at 60° F. (15.6° C.) for about 13 minutes. The molded chocolate was then placed in a 60° F. (15.6° C.) constant temperature room for subsequent demolding and storage.

What is claimed is:

1. A process for obtaining a confectionery fat from palm oil which comprises the steps of:
    (1) removing from palm oil by solvent fractionation one or more olein fractions to provide a first stearine fraction having less than about 10% combined SUU/UUU/SLS triglycerides by weight of the first stearine fraction;
    (2) removing from the first stearine fraction by solvent fractionation one or more olein fractions to provide a second stearine fraction having less than about 8% SSO triglycerides by weight of the second stearine fraction; and
    (3) removing from the second stearine fraction by solvent fractionation a third stearine fraction to provide an olein fraction containing a confectionery fat having less than about 2.5% SSS triglycerides by weight of the confectionery fat; wherein S is palmitic or stearic; and U is oleic (O) or linoleic (L).

2. The process of claim 1 wherein a solvent selected from the group consisting of hexane, mixtures of hexane and a $C_1$-$C_3$ alcohol, and acetone is used in each of steps (1) through (3).

3. The process of claim 2 wherein the solvent is acetone.

4. The process of claim 3 wherein step (1) comprises the steps of:
    (a) providing a melted mixture of acetone and palm oil in a weight ratio of from about 3:1 to about 7:1;
    (b) slowly cooling the melted mixture to crystallize out fat crystals;
    (c) holding the cooled mixture at a temperature of from about −6° to about 7° C. for about 0.5 to about 2 hours after step (b);
    (d) separating the fat crystals from the cooled mixture after step (c);
    (e) melting a mixture of acetone and the separated fat crystals in a weight ratio of from about 4:1 to about 7:1;
    (f) slowly cooling the melted mixture of step (e) to crystallize out a second portion of fat crystals;
    (g) holding the cooled mixture of step (f) at a temperature of from about 4° to about 7° C. for about 0.5 to about 2 hours after step (f); and
    (h) separating the second portion of fat crystals from the cooled mixture after step (g);
wherein step (2) comprises the steps of:
    (i) providing a melted mixture of acetone and the separated fat crystals from step (h) in a weight ratio of from about 5:1 to about 8:1;
    (j) slowly cooling the melted mixture to crystallize out a third portion of fat crystals;
    (k) holding the cooled mixture at at a temperature from about 0° to about 7° C. for about 0.5 to about 2 hours after step (j);
    (l) separating the third portion of fat crystals from the cooled mixture after step (k);
    (m) melting a mixture of acetone and the separated fat crystals from step (l) in a weight ratio of from about 5:1 to about 8:1;
    (n) repeating steps (i) through (m) to provide a fourth portion of separated fat crystals;
and wherein step (3) comprises the steps of:
    (o) providing a melted mixture of acetone and the separated fat crystals from step (n) in a weight ratio of from about 3:1 to about 6:1;
    (p) slowly cooling the melted mixture to crystallize out a fifth portion of fat crystals;
    (q) holding the cooled mixture at a temperature of from about 21° to about 22° C. for about 0.5 to about 2 hours after step (p);
    (r) separating the fifth portion of fat crystals from the cooled mixture after step (q); and
    (s) removing the acetone from the cooled mixture after step (r) to provide the confectionery fat.

5. The process of claim 3, wherein the first stearine fraction has less than about 5% combined SUU/UUU/SLS triglycerides by weight.

6. The process of claim 3, wherein the second stearine fraction has less than about 5% SSO triglycerides by weight.

7. The process of claim 3, wherein the palm oil is whole palm oil.

8. The process of claim 3, wherein two olein fractions are removed from the palm oil during step (1), and wherein two olein fractions are removed from the first stearine fraction during step (2).

9. The process of claim 3, wherein the palm oil is partially fractionated palm oil.

* * * * *